United States Patent
Zhou

(10) Patent No.: US 11,323,850 B2
(45) Date of Patent: May 3, 2022

(54) VEHICLE-TO-EVERYTHING COMMUNICATION SOLUTION

(71) Applicant: Huawei Technologies Co., Ltd., Shenzhen (CN)

(72) Inventor: Kai Zhou, Shenzhen (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

(21) Appl. No.: 17/158,566

(22) Filed: Jan. 26, 2021

(65) Prior Publication Data

US 2021/0185484 A1 Jun. 17, 2021

Related U.S. Application Data

(63) Continuation of application No. PCT/CN2019/095519, filed on Jul. 11, 2019.

(30) Foreign Application Priority Data

Jul. 27, 2018 (CN) .......................... 201810843229.X

(51) Int. Cl.
*H04W 4/029* (2018.01)
*H04W 76/11* (2018.01)
(Continued)

(52) U.S. Cl.
CPC ............. *H04W 4/029* (2018.02); *H04W 4/40* (2018.02); *H04W 8/26* (2013.01); *H04W 76/11* (2018.02); *H04W 92/18* (2013.01)

(58) Field of Classification Search
CPC ....... H04W 4/029; H04W 76/11; H04W 4/40; H04W 8/26; H04W 92/18
See application file for complete search history.

(56) References Cited

U.S. PATENT DOCUMENTS 8,332,401 B2 12/2012 Hull et al.
8,964,947 B1 2/2015 Noolu et al.
(Continued)

FOREIGN PATENT DOCUMENTS

CN 104852890 A 8/2015
CN 105128817 A 12/2015
(Continued)

OTHER PUBLICATIONS

3GPP TSG-RAN WG3 Meeting #91 bis, R3-160681, "Text proposal of MBMS for V2X," Samsung, Bangalore, India, Apr. 11-15, 2016, 2 pages.
(Continued)

*Primary Examiner* — Joshua L Schwartz
(74) *Attorney, Agent, or Firm* — Conley Rose, P.C.

(57) ABSTRACT

A vehicle-to-everything (V2X) communication solution, where when a vehicle needs to obtain a V2X service, the vehicle is first coupled to a V2X center server (V2X-C) node to which the vehicle belongs. The V2X-C node allocates a V2X regional node to the vehicle based on the geographic location of the vehicle, and sends an access address of the V2X regional node to the vehicle when the vehicle is in the V2X service region of the V2X-C node. The V2X-C node requests another V2X-C node to allocate a V2X regional node based on the geographic location of the vehicle, and sends access information of the V2X regional node to the vehicle when the vehicle is not in the V2X service region of the V2X-C node.

20 Claims, 4 Drawing Sheets

(51) Int. Cl.
*H04W 4/40* (2018.01)
*H04W 92/18* (2009.01)
*H04W 8/26* (2009.01)

(56) References Cited

U.S. PATENT DOCUMENTS

| | | | |
|---|---|---|---|
| 9,178,920 | B2 | 11/2015 | Tsukagoshi et al. |
| 10,008,111 | B1 | 6/2018 | Grant |
| 2008/0095134 | A1 | 4/2008 | Chen et al. |
| 2015/0130685 | A1 | 5/2015 | Kim et al. |
| 2016/0202943 | A1 | 7/2016 | Choi et al. |
| 2018/0049274 | A1* | 2/2018 | Kim ............... H04W 84/18 |
| 2018/0062975 | A1 | 3/2018 | Wang |
| 2018/0062976 | A1 | 3/2018 | Chia et al. |
| 2018/0180708 | A1* | 6/2018 | Vijaya Kumar ........ G01S 19/51 |
| 2019/0090099 | A1* | 3/2019 | Wang ............... H04W 4/06 |
| 2019/0289505 | A1* | 9/2019 | Thomas ............ H04W 36/08 |

FOREIGN PATENT DOCUMENTS

| | | |
|---|---|---|
| CN | 105413119 A | 3/2016 |
| CN | 106413019 A | 2/2017 |
| CN | 107295470 A | 10/2017 |
| CN | 107301774 A | 10/2017 |
| CN | 107358812 A | 11/2017 |
| CN | 107559915 A | 1/2018 |
| CN | 107659915 A | 2/2018 |
| CN | 108225320 A | 6/2018 |
| CN | 108270724 A | 7/2018 |
| KR | 20160087644 A | 7/2016 |

OTHER PUBLICATIONS

Interdigital, "Local V2X Server Discovery," 3GPP TSG-SA WG2#115, S2-162732, May 23-27, 2016, 4 pages.

Qualcomm Incorporated, "Use of PC3 interface for V2X communications control," 3GPP TSG-SA WG2#115, S2-162832, 3GPP, May 23-27, 2016, 5 pages.

ZTE, "Discussion and solution on the local server discovery," 3GPP TSG-SA WG2#116 S2-163755, 3GPP, Jul. 11-15, 2016, 3 Pages.

Qualcomm Incorporated, "USD definitions for V2X communication," 3GPP TSG-SA WG2#117, S2-165716, Oct. 17-21, 2016, 5 pages.

Qualcomm Incorporated, et al., "Unicast and multicast V2X communication support over PC5," 3GPP TSG SA WG2 #127BIS, S2-185841, May 28-Jun. 1, 2018, 21 pages.

* cited by examiner

VEHICLE-TO-EVERYTHING COMMUNICATION SOLUTION

CROSS-REFERENCE TO RELATED APPLICATIONS

This application is a continuation of International Patent Application No. PCT/CN2019/095519 filed on Jul. 11, 2019, which claims priority to Chinese Patent Application No. 201810843229.X filed on Jul. 27, 2018. The disclosures of the aforementioned applications are hereby incorporated by reference in their entireties.

TECHNICAL FIELD

This disclosure relates to the communications field, and in particular, to a communication solution in the vehicle-to-everything (V2X) field, and includes a communications architecture, method, and apparatus.

BACKGROUND

V2X is a communications system between vehicles, between a vehicle and a pedestrian or a cyclist, or between a vehicle and an infrastructure. For a vehicle, various sensors (such as a laser radar and a millimeter-wave radar) and cameras installed on the vehicle are used to obtain a vehicle driving status, a system running status (such as a braking status or an indicator light status, which may be fed back using a Controller Area Network (CAN bus)), and surrounding road environment information (a roadside system may broadcast static or dynamic information, or a high-precision map may be built in the vehicle). In addition, a Global Positioning System (GPS) or another positioning method (such as a cellular network positioning technology, a visual positioning technology, or an inertial navigation technology) is used to perform combined positioning, to obtain accurate location information of the vehicle. Then, the information is transmitted in an end-to-end manner using technologies such as a short-distance communications technology and a cellular network communications technology, to share the information in an entire V2X system. The information is analyzed and processed, and a road condition is reported to and a driving condition warning is provided for a driver in time in order to effectively improve vehicle communication efficiency, and improve vehicle communication safety.

FIG. 1 shows a V2X architecture in the industry. Vehicles may communicate with each other through a PCS interface. The vehicle may further communicate with a V2X server through a Uu interface. A device such as a smart road facility (for example, a traffic light signal controller or an electronic sign), a pedestrian, or an e-bike may also be connected to the V2X server to implement V2X communication. In the V2X architecture shown in FIG. 1, only networking of a single V2X server is considered. However, during actual V2X network deployment, departments or organizations in different regions deploy respective V2X servers, and V2X deployment plans and progresses in different regions are inconsistent. How to implement V2X communication between vehicles in a networking architecture with a plurality of V2X servers becomes a key technical problem for large-scale commercial use of V2X.

SUMMARY

This disclosure provides a V2X communication solution, to resolve a problem of cross-region and cross-department V2X interconnection such that a vehicle can enjoy a V2X service wherever the vehicle travels.

The embodiments of this disclosure provide an architecture or a concept of a V2X center server (V2X-C) alliance. V2X-C nodes constructed by a plurality of regions, organizations, or institutions form a V2X-C alliance based on planning or self-organization. The V2X-C nodes in the alliance exchange information about V2X service regions of the V2X nodes with each other. When a vehicle needs to obtain a V2X service, the vehicle is first connected to a V2X-C node to which the vehicle belongs (or is licensed). Then, the V2X-C node determines, based on a current location of the vehicle, whether the vehicle is in a V2X service region covered by the V2X-C. If the vehicle is in the V2X service region, the V2X-C node allocates a V2X regional node in a region in which the vehicle is located to the vehicle based on the geographic location of the vehicle, and sends an access address of the V2X regional node to the vehicle. If the vehicle is not in the V2X service region, the V2X-C node requests another V2X-C node to allocate a V2X regional node based on the geographic location of the vehicle, and sends access information of the V2X regional node to the vehicle such that the vehicle can access a V2X server in a region in which the vehicle is currently located and enjoy a V2X service.

Based on the foregoing concept, this disclosure provides a V2X communications method. It is assumed that a V2X-C alliance includes two center servers a first center server and a second center server. The first center server is a center server for vehicle registration. The first center server receives a request message from a vehicle for obtaining server information. The request message from the vehicle for obtaining server information includes an identifier of the vehicle and location information of the vehicle. A location indicated by the location information of the vehicle is in a service region of the second center server. The first center server sends a request message for obtaining server information to the second center server. The request message for obtaining server information sent by the first center server includes the location information of the vehicle. The first center server receives addressing information of a regional server from the second center server. The regional server is a server that is determined by the second center server based on the location information of the vehicle and that provides a service for a vehicle in a region in which the vehicle is located. The first center server returns the addressing information of the regional server to the vehicle. It can be learned that, according to the method provided in this disclosure, even if the vehicle is not in a region managed or served by a registration server, that is, the first center server, the vehicle may still enjoy a V2X service, thereby ensuring continuity of the V2X service, and improving user experience.

To ensure that the first center server can determine or allocate a regional server in a region in which the vehicle is located, before the first center server receives the request message from the vehicle for obtaining server information, the first center server receives service information of the second center server. The service information includes addressing information of the second center server and the service region of the second center server.

The first center server is the server for vehicle registration, and needs to store complete registration and service-related information of the vehicle. Even if the vehicle travels in another region and another server provides a V2X service for the vehicle, the first center server also needs to obtain related service data. Therefore, after the first center server receives the addressing information of the regional server from the second center server, the first center server subscribes to service data of the vehicle from the regional server. The request message for subscribing to the service data of the vehicle includes the identifier of the vehicle.

To ensure communication reliability, some redundant nodes are usually deployed on a communications network, for example, an active node and a standby node are disposed. For example, an active server and a standby server may be deployed to implement functions of the second center server. One server is an active node, and the other server is a standby node. When the active node is faulty, the standby node replaces the active node. After recovering from the fault, the active node bears a function of the standby node. Therefore, the first center server needs to store service information of the active node and the standby node, that is, addressing information of the active node, a service region of the active node, priority information (for example, an active identifier) of the active node, addressing information of the standby node, a service region of the standby node, and priority information (for example, a standby identifier) of the standby node. When the first center server needs to request a regional server from the second center server, the first center server preferentially contacts the active node. When the active node is unreachable (for example, there is no response or a timeout occurs), the first center server contacts the standby node.

The V2X communication solution provided in this disclosure relates to a V2X server and a communications apparatus built in or integrated into a vehicle. Therefore, this disclosure further provides an apparatus and a server for implementing the foregoing V2X communications method.

In addition, this disclosure further provides a computer-readable storage medium. The computer-readable storage medium stores an instruction. When the instruction is run on a computer, the computer is enabled to perform the foregoing V2X communications method.

Finally, this disclosure provides a computer program product including an instruction. When the computer program product runs on a computer, the computer is enabled to perform the foregoing V2X communications method.

DESCRIPTION OF EMBODIMENTS

This disclosure provides a communications architecture with a plurality of V2X servers and a V2X communication solution used when a vehicle travels across V2X service regions.

Figure 1:
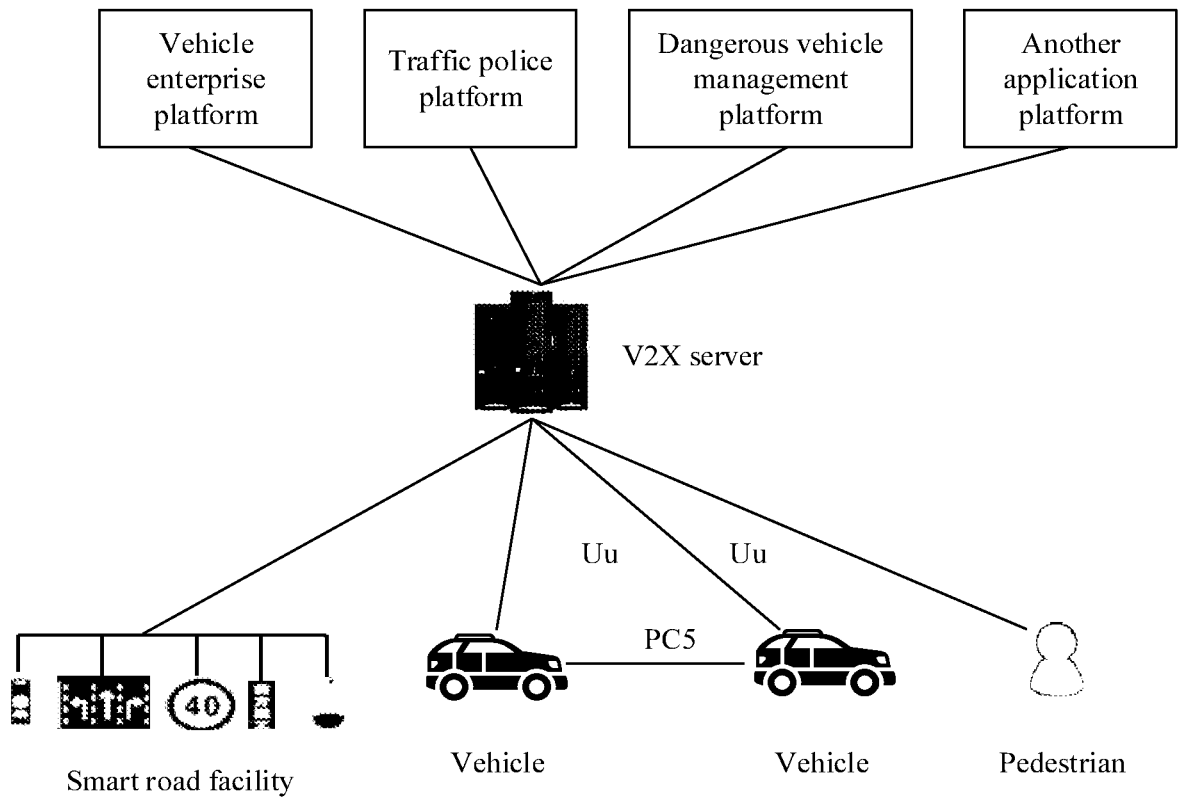
FIG. 1 is a schematic diagram of a V2X system architecture.
Figure 2:
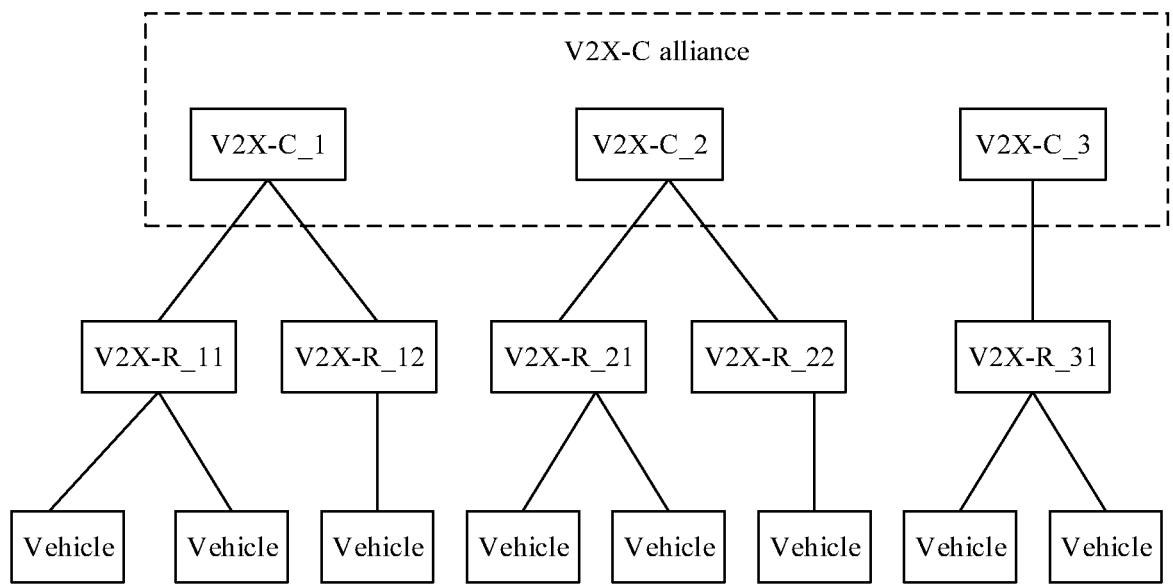
FIG. 2 is a schematic diagram of a V2X system architecture according to an embodiment of this disclosure.

FIG. 2 shows an architecture or a concept of a V2X-C alliance according to this disclosure. A V2X-C shown in FIG. 2 is a server or a node for initial registration of a vehicle, records registration data of the vehicle, and further records running data of the vehicle. Optionally, the V2X-C may provide a vehicle management capability for an organization such as traffic police or a road supervision organization. A vehicle enterprise or another third-party application may also obtain the running data of the vehicle using the server. A V2X regional server (V2X-R) is a server or a node that provides a V2X service for a vehicle. The provided V2X service is, for example, a V2I service (for example, a notification of a traffic signal light status and a notification of a traffic time), a V2V service (for example, generating warning information based on information reported by a surrounding vehicle and notifying the vehicle of the warning information), or the like. The V2X-C serves or covers a relatively large region. For example, a V2X-C_1 covers or serves Shenzhen, and a V2X-C_2 covers or serves Guangzhou. A plurality of V2X-Rs are deployed in the region covered by the V2X-C, the V2X-C allocates a V2X-R to the vehicle, and the V2X-R directly provides a V2X service for the vehicle. A plurality of V2X-Cs form a V2X-C alliance. The V2X-Cs in the V2X-C alliance store respective addresses and served or covered geographic regions.

When the vehicle needs to obtain a V2X service, the vehicle is first connected to a V2X-C that is initially configured during license registration or an initially registered V2X-C. Then, the V2X-C node determines, based on current location information of the vehicle, whether the vehicle is in a region served by the V2X-C. If the vehicle is in the region, the V2X-C node allocates a V2X-R in the region served by the V2X-C to the vehicle based on the geographic location of the vehicle. If the vehicle is not in the region, the V2X-C node requests another V2X-C node to allocate a V2X-R based on the geographic location of the vehicle. The V2X-C may further subscribe to the running data or the service data of the vehicle from the V2X-R allocated to the vehicle.

It should be noted that, in the embodiments of this disclosure, the V2X-C server and the V2X-C node are two different names of a same V2X-C entity. From a perspective of a service model, because the V2X-C provides a service for a vehicle, the V2X-C is referred to as a "V2X-C server". From a perspective of a network architecture, because the V2X-C is a node on a network, the V2X-C may also be referred to as a "V2X-C node". In this disclosure, the V2X-C server and the V2X-C node may be interchangeably used. However, a person skilled in the art should understand that the V2X-C server and the V2X-C node point to a same V2X-C entity. Similarly, in this disclosure, a V2X-R server and a V2X-R node may also be interchangeably used. In addition, it should be further noted that the concept of the "V2X-C alliance" provided in this disclosure is a possible name of the concept provided in this disclosure. In a case of substantially identical architectures and solutions, the "V2X-C alliance" may also be referred to as a "V2X-C group", a "V2X-C organization", or the like.

Figure 3:
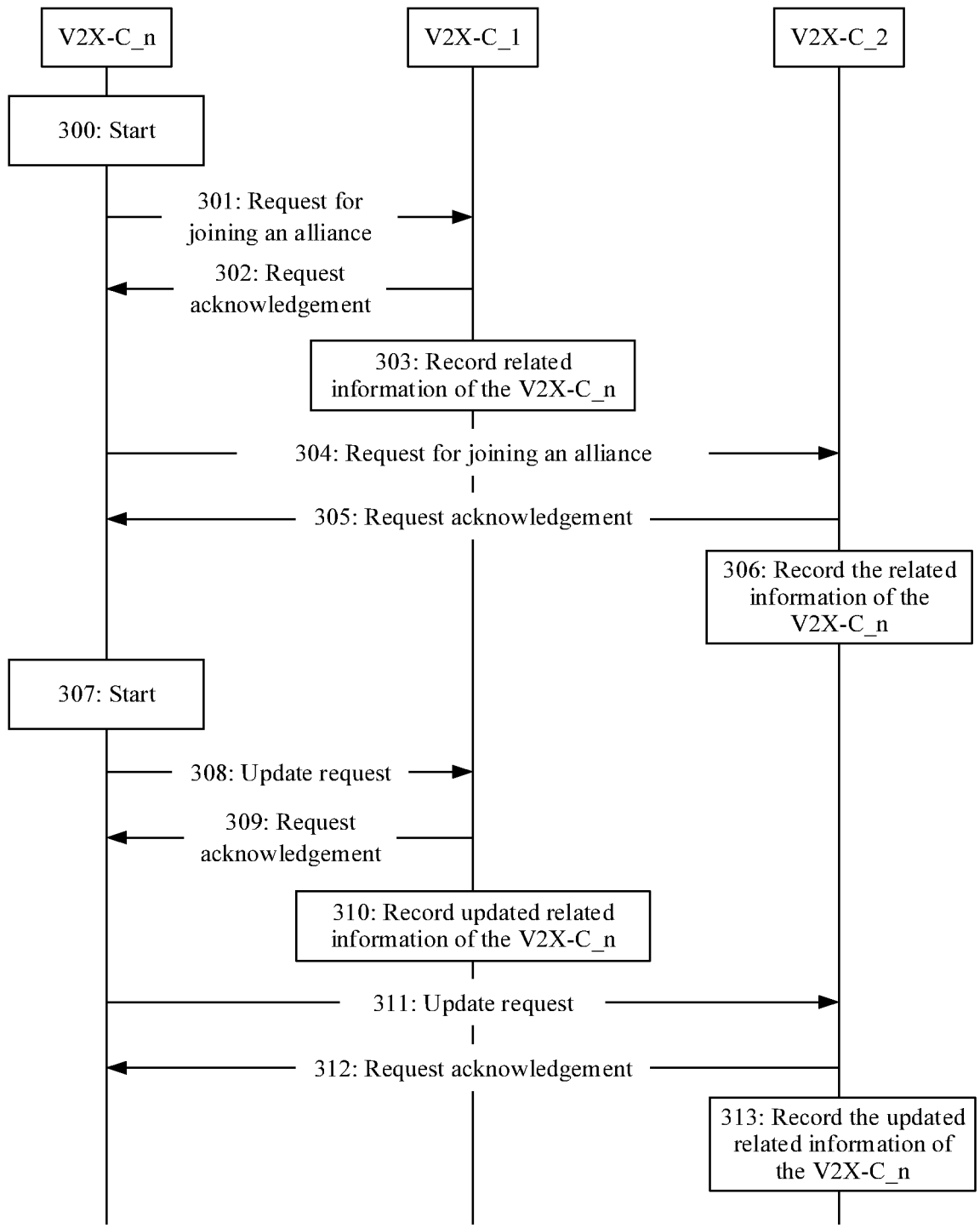
FIG. 3 is a schematic flowchart of creating a V2X center server alliance according to an embodiment of this disclosure.

Based on the foregoing architecture and concept, an embodiment of this disclosure provides a possible V2X-C alliance establishment and update procedure, as shown in FIG. 3.

300: A V2X-C_1 and a V2X-C_2 are two V2X-C nodes in a same V2X-C alliance. A new V2X-C_n node is powered on and started, and prepares to provide a V2X service in a specific region (for example, Shenzhen).

301: The V2X-C_n node initiates a request for joining the alliance to the V2X-C node in the V2X-C alliance. An address of the V2X-C node in the V2X-C alliance may be manually configured by the new V2X-C_n node, or may be obtained by the new V2X-C_n node from a server that manages the V2X-C alliance. In conclusion, a manner of obtaining the address of the V2X-C node in the V2X-C alliance by the V2X-C_n is not limited in this disclosure. The request message for joining the V2X-C alliance includes addressing information of the V2X-C_n (for example, an identifier, a Hypertext Transfer Protocol Secure (HTTPS) Uniform Resource Locator (URL), or other addressable information of the V2X-C_n), and a coverage region or a service region of the V2X-C_n. The service region or the coverage region may be identified in a plurality of manners (for example, using a group of GPS coordinates). Optionally, the request message for joining the V2X-C alliance further includes priority information of the V2X-C_n (for example, whether of the V2X-C_n is active or standby), which is used to support reliable networking. For example, an active node and a standby node: a V2X-C_n1 and a V2X-C_n2 may be deployed on the V2X-C_n. The V2X-C_n1 is an active server, and the V2X-C_n2 is a standby server. When the V2X-C_n1 is faulty, the V2X-C_n2 replaces the V2X-C_n1. In this case, both the V2X-C_n1 and the V2X-C_n2 need to execute the procedure of joining the alliance shown in FIG. 3. In addition to the foregoing information, the request message that is for joining the V2X-C alliance and that is sent by the V2X-C_n1 further includes priority information indicating that the server is an active server. In addition to the foregoing information, the request message that is for joining the V2X-C alliance and that is sent by the V2X-C_n2 further includes priority information indicating that the server is a standby server. Therefore, the V2X-C_1 and the V2X-C_2 preferentially contact the V2X-C_n1, and when the V2X-C_n1 is unreachable, contact the V2X-C_n2.

302: After receiving the message, the V2X-C_1 returns a success response message such as 200 OK. It should be noted that, before receiving the request for joining the alliance that is sent by the V2X-C_n, the V2X-C_1 may further need to perform security-related authentication and authorization on the V2X-C_n. Optionally, the response message may include a service region of the V2X-C_1, for example, a group of GPS coordinates. Optionally, the V2X-C_1 node may further provide an interface for the V2X-C_n node to query a region covered or served by the V2X-C_1.

303: The V2X-C_1 node stores the addressing information of the V2X-C_n node and the service region of the V2X-C_n node.

304 to 306: The V2X-C_n repeats the foregoing procedure of requesting to join the alliance in 301 to 303, and requests another V2X-C node in the V2X-C alliance to join the alliance. After requesting all V2X-C nodes in the V2X-C alliance to join the alliance, the V2X-C_n node successfully joins the alliance.

307: It is assumed that the service region becomes larger after the V2X-C_n node successfully joins the alliance. For example, the V2X-C_n originally covers a V2X service of only one district of Shenzhen, but now covers all V2X services in Shenzhen. For another example, due to road expansion, a new road is added to the coverage region. In this case, a service region update procedure may be initiated, as shown in FIG. 3.

308: The V2X-C_n node sends a V2X service region update message to the V2X-C_1 node, where the message contains an updated service region.

309: The V2X-C_1 node returns a success response.

310: The V2X-C_1 node stores the updated coverage region or service region of the V2X-C_n node.

311 to 313: The V2X-C_n node repeatedly initiates the update procedure to another V2X-C node in the alliance.

In the procedure shown in FIG. 3, even if a V2X service is constructed or deployed by management organizations of different institutions in different regions, different V2X-Cs can communicate with each other to form an alliance. Further, when a vehicle travels across regions, the vehicle may also perform V2X communication, and enjoy the V2X service.

Figure 4:
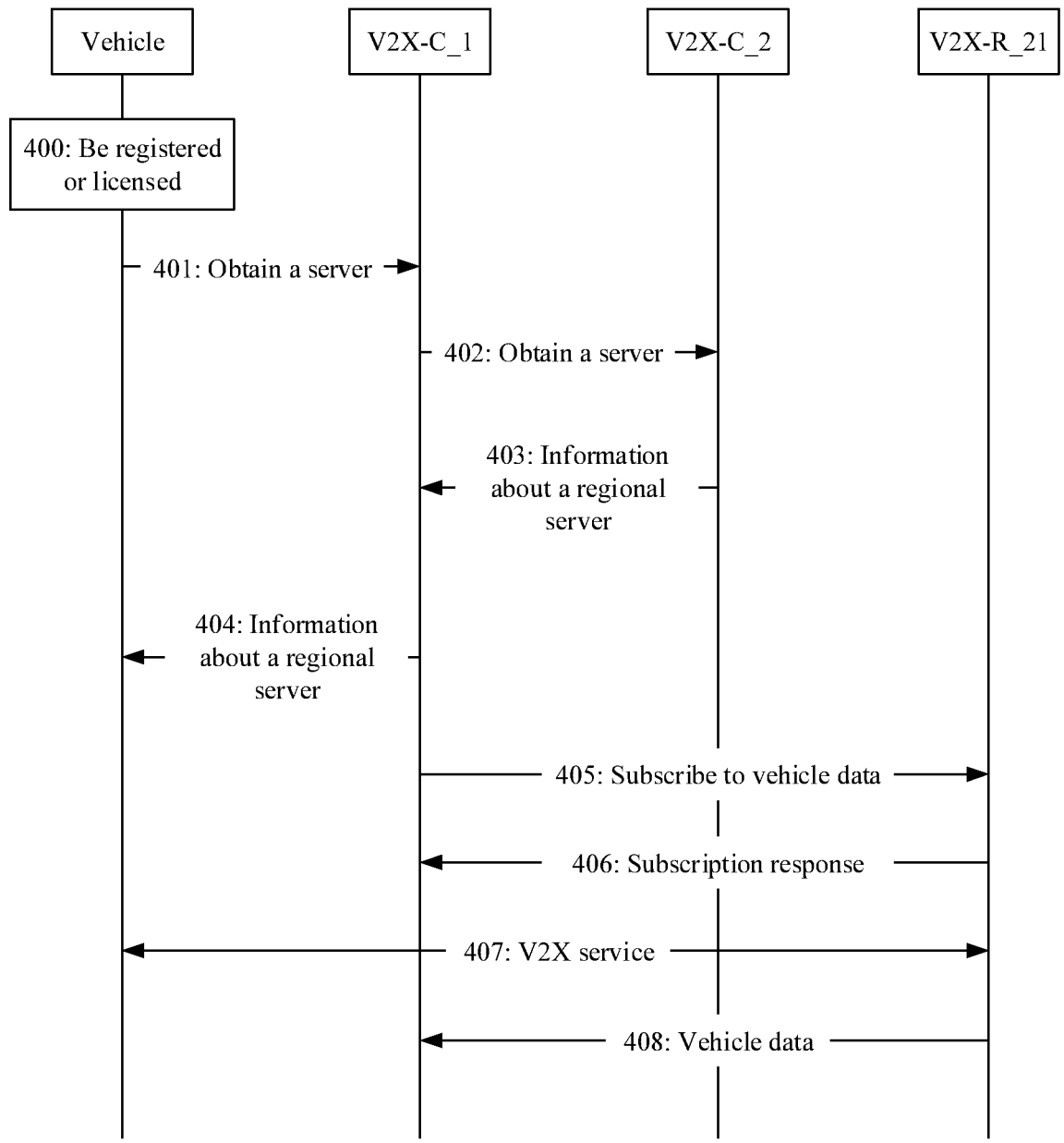
FIG. 4 is a schematic flowchart of a V2X service in a V2X roaming scenario according to an embodiment of this disclosure.

FIG. 4 shows a V2X communication procedure when a vehicle travels across regions provided in this disclosure based on the foregoing concept and alliance architecture.

400: An address of a V2X-C_1 is configured to be an access address for the vehicle. The V2X-C_1 is a V2X center server with which the vehicle is registered for the first time. For example, if the vehicle is licensed in Shenzhen, the V2X-C_1 may be a V2X center server of Shenzhen traffic police. The V2X-C_1 may be configured in a plurality of manners, for example, using a vehicle service platform of a vehicle factory or an application client.

401: When the vehicle needs a V2X service, the vehicle first requests the V2X-C_1 to obtain information about a V2X server that provides a service for the vehicle. The request message contains location information of the vehicle and identification information of the vehicle (for example, a vehicle identity number (VIN)). Optionally, the request message may further contain information such as location accuracy.

402: The V2X-C_1 determines a region in which the vehicle is located based on the location information of the vehicle, and a V2X center server that provides a service for the region allocates a V2X regional server to the vehicle. If the region in which the vehicle is located is within a coverage of the V2X-C_1 node, an address of a V2X-R_11 within the coverage of the V2X-C_1 node is directly returned to the vehicle, and the procedure shown in FIG. 4 directly goes to 405 and subsequent steps. If the region in which the vehicle is located is not within the coverage of the V2X-C_1 node, a V2X center server that provides a V2X service for the region: a V2X-C_2 is further determined, and the V2X-C_1 sends a server request message to the V2X-C_2, to request the V2X-C_2 to allocate a regional server to the vehicle. The request message contains address information of the vehicle. For example, if the V2X-C_1 is a V2X center server of Shenzhen traffic police and the vehicle is currently located in Guangzhou, the V2X-C_1 determines that the V2X-C_2 is a V2X center server of Guangzhou traffic police. If there are a plurality of V2X center servers in Guangzhou, a V2X center server with a highest priority is selected.

403: The V2X-C_2 determines, based on the location information of the vehicle, a V2X regional server V2X-R_21 that provides a service for the region in which the vehicle is located, and returns addressing information of the V2X-R_21 to the V2X-C_1. The addressing information may be information such as an identifier or an address that may be routed to the V2X-R_21.

404: The V2X-C_1 sends the addressing information of the V2X-R_21 node to the vehicle.

405 and 406: Optionally, the V2X-C_1 subscribes to data of the vehicle from the V2X-R_11 or the V2X-R_21. The subscription request in 405 contains an identifier of the vehicle.

407: After receiving the message in 404, the vehicle communicates with the regional server (V2X-R_11 or V2X-R_21) to report or receive V2X data.

408: The regional server sends the V2X data of the vehicle to the V2X-C_1 that subscribes to the data, to implement data openness and comprehensive data analysis.

In the method procedure shown in FIG. 4, when the vehicle is in a coverage region of a V2X center server in a non-home location, a V2X center server in a registration location (or home location) cooperates with a V2X center server and a regional server in a roaming location (or visited location) to provide a V2X service for the vehicle. In addition, running data of the vehicle may still be sent by the server in the visited location to the V2X server in the registration location, thereby implementing data openness.

The foregoing mainly describes the solutions provided in the embodiments of the present disclosure from a perspective of the architecture and the method procedure. It may be understood that, to implement the foregoing functions, entities such as a vehicle and a V2X server include a corresponding hardware structure and/or software module for performing each function. A person skilled in the art should be easily aware that the method procedure described with reference to the embodiments disclosed in this specification may be implemented by hardware or a combination of hardware and computer software in the present disclosure. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 5:
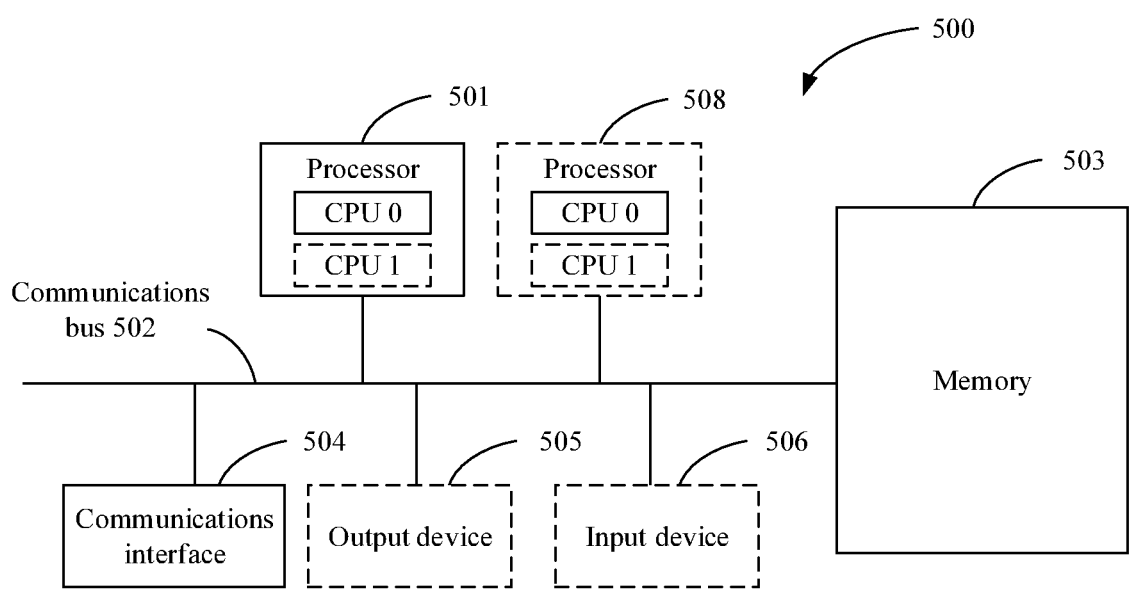
FIG. 5 is a schematic structural diagram of an apparatus according to an embodiment of this disclosure.

For example, a communications module or a communications apparatus that is in the vehicle and that is responsible for communicating with the V2X server in the foregoing embodiments, and the V2X server may be implemented by an apparatus shown in FIG. 5.

The apparatus 500 includes at least one processor 501, a communications bus 502, a memory 503, and at least one communications interface 504.

The processor 501 may be a general-purpose central processing unit (CPU), a microprocessor, an application-specific integrated circuit (ASIC), or one or more integrated circuits for controlling program execution of the solutions of the present disclosure.

The communications bus 502 may include a path for transmitting information between the foregoing components.

The communications interface 504 uses any apparatus such as a transceiver to communicate with another device or a communications network such as the Ethernet, a radio access network (RAN), or a wireless local area network (WLAN).

The memory 503 may be a read-only memory (ROM) or another type of static storage device that can store static information and an instruction, or a random-access memory (RAM) or another type of dynamic storage device that can store information and an instruction, or may be an electrically erasable programmable ROM (EEPROM), a compact disc (CD) ROM (CD-ROM) or another optical disk storage, an optical disc storage (including a compact disc, a laser disc, an optical disc, a digital versatile disc (DVD), a BLU-RAY DISC, or the like), a disk storage medium or another magnetic storage device, or any other medium that can be used to carry or store expected program code in a form of an instruction or a data structure and that can be accessed by a computer. However, this is not limited thereto. The memory may exist independently, and is connected to the processor using the bus. The memory may alternatively be integrated with the processor.

The memory 503 is configured to store application program code for performing the solutions of this disclosure, and the processor 501 controls the execution. The processor 501 is configured to execute the application program code stored in the memory 503, to implement a function of the vehicle or the V2X server in the method of this disclosure.

During specific implementation, in an embodiment, the processor 501 may include one or more CPUs, such as a CPU 0 and a CPU 1 in FIG. 5.

During specific implementation, in an embodiment, the apparatus 500 may include a plurality of processors, for example, the processor 501 and a processor 508 in FIG. 5. Each of the processors may be a single-core processor or a multi-core processor. The processor herein may be one or more devices, circuits, and/or processing cores for processing data (for example, a computer program instruction).

During specific implementation, in an embodiment, the apparatus 500 may further include an output device 505 and an input device 506. The output device 505 communicates with the processor 501, and may display information in a plurality of manners. For example, the output device 505 may be a liquid-crystal display (LCD), a light-emitting diode (LED) display device, a cathode-ray tube (CRT) display device, or a projector. The input device 506 communicates with the processor 501, and may receive a user input in a plurality of manners. For example, the input device 506 may be a mouse, a keyboard, a touchscreen device, or a sensor device.

When the foregoing apparatus implements a function of the V2X server, the apparatus 500 may be a general-purpose server or a dedicated server.

When the foregoing apparatus implements a vehicle-related function in the embodiments of this disclosure, the apparatus 500 may be a telematics box (T-Box) or a multi-domain controller (MDC) integrated into a vehicle. Optionally, the apparatus 500 may alternatively be a chip integrated into a vehicle. Therefore, a function/an implementation process of the communications interface 504 may alternatively be implemented using a pin, a circuit, or the like. The memory is a storage unit in the chip, for example, a register or a cache. The storage unit may alternatively be a storage unit located outside the chip.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and benefits of the present disclosure are further described in detail in the foregoing specific embodiments. The person of skill in the art should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

What is claimed is:

1. A vehicle-to-everything (V2X) communications system comprising:
   a first center server configured to:
      receive, from a vehicle, a first request message comprising a first identifier of the vehicle and location information of the vehicle, wherein the location information indicates a location in a service region of a second center server of the V2X communications system; and
      send, to the second center server, a second request message comprising the location information; and
   the second center server configured to:
      receive the second request message;
      determine, based on the location information and a service that provides for the vehicle in the service region, a regional server located in the service region; and
      send first addressing information of the regional server to the first center server, wherein the first center server is further configured to:
      receive the first addressing information from the second center server; and
      send the first addressing information to the vehicle.

2. The V2X communications system of claim 1, wherein after the first center server receives the first addressing information, the first center server is further configured to send a subscription request to the regional server to subscribe to service data of the vehicle from the regional server, and wherein the subscription request comprises the first identifier.

3. The V2X communications system of claim 1, wherein the first addressing information comprises a second identifier of the regional server.

4. The V2X communications system of claim 1, wherein the first addressing information comprises an address of the regional server.

5. The V2X communications system of claim 1, wherein before the first center server receives the first request message, the first center server is further configured to receive service information of the second center server comprising second addressing information of the second center server and the service region.

6. The V2X communications system of claim 5, wherein the service information further comprises priority information of the second center server.

7. A vehicle-to-everything (V2X) communications method implemented by a first center server, wherein the V2X communications method comprises:
   receiving, from a vehicle, a first request message comprising a first identifier of the vehicle and location information of the vehicle, wherein the location information indicates a location in a service region of a second center server;
   sending, to the second center server, a second request message comprising the location information;
   receiving, from the second center server, first addressing information of a regional server, wherein the regional server is located in the service region and is associated with the location information and a service that provides for the vehicle in the service region; and
   sending the first addressing information to the vehicle.

8. The V2X communications method of claim 7, wherein after receiving the first addressing information, the V2X communications method further comprises sending a subscription request to the regional server to subscribe to service data of the vehicle from the regional server, and wherein the subscription request comprises the first identifier.

9. The V2X communications method of claim 7, wherein the first addressing information comprises a second identifier of the regional server.

10. The V2X communications method of claim 7, wherein before receiving the first request message, the V2X communications method further comprises receiving service information of the second center server, and wherein the service information comprises second addressing information of the second center server and the service region.

11. The V2X communications method of claim 10, wherein the service information further comprises priority information of the second center server.

12. A vehicle-to-everything (V2X) server, comprising:
   an interface; and
   a processor coupled to the interface and configured to:
      receive, from a vehicle using the interface, a first request message comprising a first identifier of the vehicle and location information of the vehicle, wherein the location information indicates a location in a service region of a center server;
      send, using the interface, a second request message comprising the location information to the center server;
      receive, using the interface, first addressing information of a regional server from the center server, wherein the regional server is in the service region and is determined by the center server based on the location information and a service that provides for the vehicle in the service region; and
      send, using the interface, the first addressing information to the vehicle.

13. The V2X server of claim 12, wherein the processor is further configured to send, using the interface, a subscription request message to the regional server to subscribe to service data of the vehicle from the regional server, and wherein the subscription request message comprises the first identifier.

14. The V2X server of claim 12, wherein the first addressing information comprises a second identifier of the regional server.

15. The V2X server of claim 12, wherein the processor is further configured to receive, using the interface, service information of the center server, and wherein the service information comprises second addressing information of the center server and the service region.

16. The V2X server of claim 15, wherein the service information further comprises priority information of the center server.

17. A vehicle, comprising:
an interface; and
a processor coupled to the interface and configured to:
send, using the interface, a request message to a first center server, wherein the request message comprises an identifier of the vehicle and location information of the vehicle, wherein the location information indicates a location in a service region of a second center server; and
receive addressing information of a regional server from the first center server, wherein the regional server is in a region served by the second center server and provides a service for the vehicle in the region.

18. An in-vehicle communications apparatus comprising:
an interface; and
a processor coupled to the interface and configured to:
send, using the interface, a request message to a first center server, wherein the request message comprises an identifier of a vehicle to which the in-vehicle communications apparatus belongs and location information of the vehicle, wherein the location information indicates a location in a service region of a second center server; and
receive addressing information of a regional server from the first center server, wherein the regional server is in a region served by the second center server and provides a service for the vehicle in the region.

19. The V2X communications method of claim 7, wherein the first addressing information comprises an address of the regional server.

20. The V2X server of claim 12, wherein the first addressing information comprises an address of the regional server.

* * * * *

UNITED STATES PATENT AND TRADEMARK OFFICE
CERTIFICATE OF CORRECTION

PATENT NO. : 11,323,850 B2
APPLICATION NO. : 17/158566
DATED : May 3, 2022
INVENTOR(S) : Kai Zhou Page 1 of 1

It is certified that error appears in the above-identified patent and that said Letters Patent is hereby corrected as shown below:

On the Title Page

(71) Applicant: "Huawei Technologies Co., Ltd., Shenzhen (CN)" should read "Huawei Cloud Computing Technologies Co., Ltd., Guizhou (CN)"

Signed and Sealed this
Second Day of August, 2022

Katherine Kelly Vidal
*Director of the United States Patent and Trademark Office*